No. 676,243. Patented June 11, 1901.
W. ROMMEL & T. R. OWEN.
HITCHING FETTER FOR ANIMALS.
(Application filed June 10, 1898.)
(No Model.)
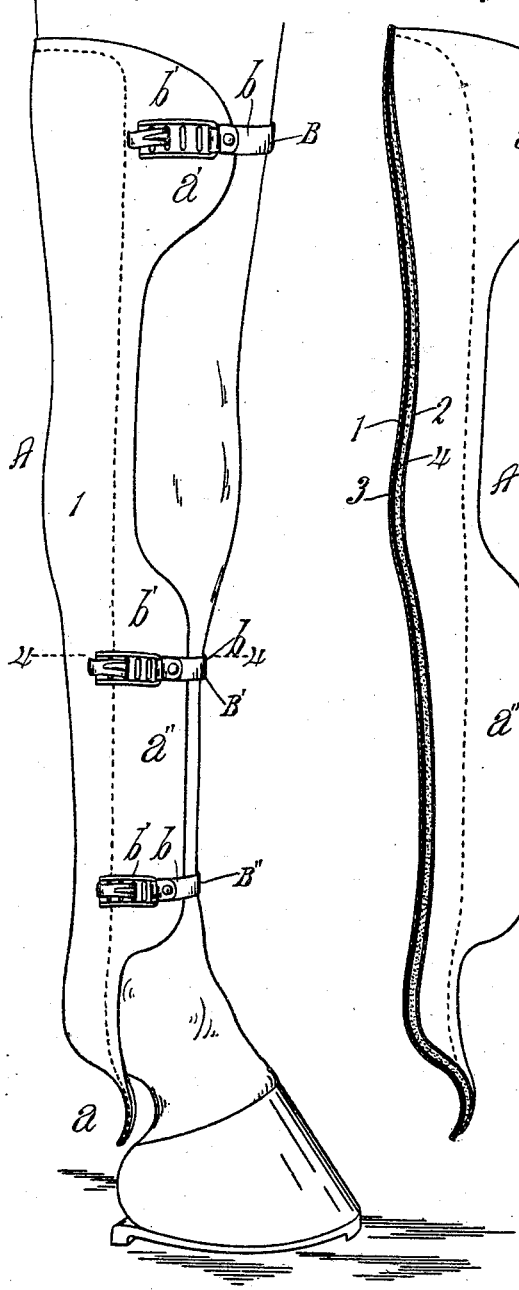
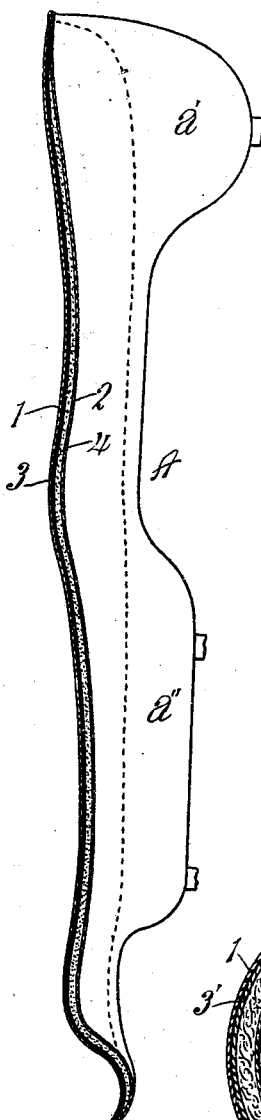
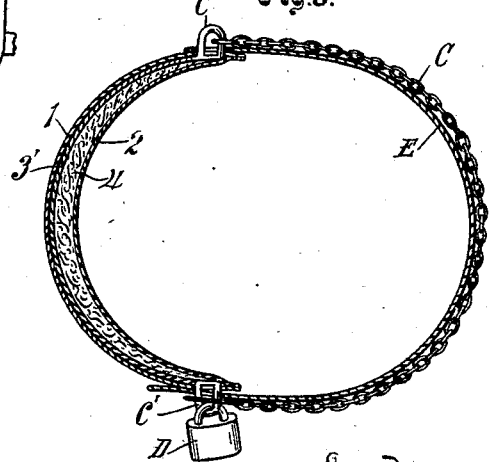
Witnesses
Percy Kingman.
Geo. A. Johnson.
Inventors
William Rommel
Thomas R. Owen
by Townsend Bros
Their attys.

UNITED STATES PATENT OFFICE.

WILLIAM ROMMEL AND THOMAS R. OWEN, OF LOS ANGELES, CALIFORNIA.

HITCHING-FETTER FOR ANIMALS.

SPECIFICATION forming part of Letters Patent No. 676,243, dated June 11, 1901.

Application filed June 10, 1898. Serial No. 683,060. (No model.)

*To all whom it may concern:*

Be it known that we, WILLIAM ROMMEL and THOMAS R. OWEN, residing at Los Angeles, in the county of Los Angeles and State of California, have invented Improvements in Hitching-Fetters for Animals, of which the following is a specification.

The object of our invention is to provide an improved simple light portable hitching device which will take the place of hitching-posts, halters, and other appliances for holding animals to prevent them from moving from the place where it is desired to have them stand.

Our invention is adapted to afford cavalrymen a perfect means of stationing their horses without any attendant and to absolutely prevent the horses from straying or escaping without human aid. A horse when fastened with this fetter becomes tame even in the presence of danger.

Our invention also embraces an improvement in means for locking a horse, so that he cannot be stolen without unlocking or destroying the fetter.

Our invention consists in a hitching-fetter comprising a boot or splint to extend over a joint of the leg and to fit under the pastern-joint and provided with conveniently-foldable means for fastening the boot or splint to the leg and being sufficiently rigid to prevent the animal from bending his leg. This fetter is so effectual that it will prevent the animal from pawing or stepping upon the sidewalk, and yet is easy to the animal.

This invention may be applied in different forms, and in the accompanying drawings we have illustrated two forms in which it may be applied.

Figure 1 shows our hitching-fetter as applied to extend from below the pastern-joint to above the knee-joint. Fig. 2 is a vertical mid-section of the fetter shown in Fig. 1. Fig. 3 is a plan section on the line indicated by 3 3, Fig. 1, but showing our appliance as arranged for locking the horse, so as to prevent him from being stolen.

A in a general way indicates the splint for carrying out our invention. The splint A is preferably hollowed and shaped to conform to the shape of the horse's leg and is preferably made of two layers or covers of leather or other suitable material 1 2, with a stiffening-rib of steel, galvanized iron, or other suitable material 3 and with an inner padding 4 between the rib and the inside cover 2; but it is to be understood that we do not limit our fetter to this form of construction, the purpose being to compel the animal to stand wherever the fetter is applied until the fetter is released, and this being accomplished by preventing the animal from bending his leg. The fetter is made to fit the back of the fore leg and to extend down below the pastern-joint and is there provided with an inward projection, as at $a$, to extend under such joint and almost to the horse's heel, so as to interfere with any upward movement of the heel, and thus prevent the horse from bending up his hoof in the manner in which it is bent when he raises his leg, thus to give additional security to the fetter in the case of unusually fractious horses.

B B' B" indicate means for fastening the splint or boot to the leg. In the forms shown in Figs. 1 and 2 this fastening consists of a strap $b$ and a suitable buckle $b'$. The boot is preferably enlarged, as at the flaps $a'$ $a''$, where the straps are applied, thus to guard against any undue pressure or chafing of the leg.

In Fig. 3, $c\ c'$ indicate staples which are fastened to lateral extensions of the stiffening 3' and extend laterally from the splint to receive the chain C and the padlock D. This fastening is preferably applied at the place occupied by the fastening B' (shown in Fig. 1) and prevents the horse's leg from being drawn out of the boot or splint even though the upper and lower fastenings B and B" were to be released.

E indicates a strap to prevent the chain from galling the leg.

In practical use the fetter is applied to the horse's leg, and when fastened in place by the fastenings B, B', B", or C the horse is unable to move his foot.

The perfect bendability of the chain C and the strap E allows the appliance to be folded into a convenient substantially-straight bundle, which can be stored away in small space.

The lateral projections extend to practically chamber the leg in the splint, thus to hold the chains or straps from galling the leg without making the splint too clumsy for satisfactory use.

It is to be understood that the band which is fastened to the enlargements may be of any
5 suitable character, either a chain or other suitable device.

Now, having described our invention, what we claim as new, and desire to secure by Letters Patent, is—
10 A hitching-fetter comprising a boot or splint to extend from above the knee-joint of the leg to below the pastern-joint; and provided with an inward projection to engage the heel of the animal's foot and means for fastening the splint or boot to the leg, said splint being 15 sufficiently rigid to prevent the animal from bending its leg.

WILLIAM ROMMEL.
THOMAS R. OWEN.

Witnesses:
JAMES R. TOWNSEND,
REX GARRETT,
J. E. KOEBERLE.